United States Patent [19]

Tweeddale

[11] 4,309,072
[45] Jan. 5, 1982

[54] CABLE PROTECTION FROM RODENTS

[75] Inventor: Andrew D. Tweeddale, Issaquah, Wash.

[73] Assignee: The United States of America as represented by the Secretary of the Air Force, Washington, D.C.

[21] Appl. No.: 140,530

[22] Filed: Apr. 15, 1980

[51] Int. Cl.³ .............................. G02B 5/16; B32B 1/08
[52] U.S. Cl. ................................. 350/96.23; 174/136;
428/36; 428/174; 428/907
[58] Field of Search ............... 428/36, 174, 907, 375;
52/101; 174/136; 350/96.23; 47/23.25;
138/121, 173

[56] References Cited

U.S. PATENT DOCUMENTS 3,928,519  12/1975  Kashiyama et al. .................. 264/40
4,159,395   6/1979  Cogelia .............................. 174/136

FOREIGN PATENT DOCUMENTS 21097  3/1916  Denmark .......................... 174/139

Primary Examiner—Paul J. Thibodeau
Attorney, Agent, or Firm—Donald J. Singer; Jacob N. Erlich

[57] ABSTRACT

A protective sheath for use over a buried fibre optic cable wherein a plurality of spikes extend radially outward from an outer jacket which completely encircles and covers the fibre optic cable bundle which is surrounded by an inner jacket. The inner jacket, outer jacket and spikes are fabricated of a plastic composite material produced by polymerization which can be molded, extruded or cast into a suitable spiked shape. The cable is thereby protected from chewing or gnawing rodents that may be burrowing in the vicinity and would be discouraged from attacking the fibre optic cable even from underneath.

1 Claim, 2 Drawing Figures

CABLE PROTECTION FROM RODENTS

STATEMENT OF GOVERNMENT INTEREST

The invention described herein may be manufactured and used by or for the Government for governmental purposes without the payment of any royalty thereon.

BACKGROUND OF THE INVENTION

This invention relates to cable protection from rodents and, more particularly, the invention is concerned with providing a protective sheath for completely encircling and covering a buried fibre optic cable to prevent damage caused by chewing and/or gnawing rodents. A plastic jacket with outward radially extending spikes is used to cover the cable so that rodents will be discouraged from causing damage to the cable if it obstructs their path.

Heretofore, the most often used solution to prevent damage to a fibre optic cable communication system was to encase the fibre bundle in a metal jacket, usually steel. This jacket prevents the rodents from reaching the inner fibre optic cable. However, the solution adds significantly to the cost of manufacturing the cable as well as adding to the installation costs for the cable. The metal jacket required grounding in order to handle any potential Electro Magnetic Pulse (EMP) problems and to provide personnel safety from possible shocks if the metal shield contacts an electrical source. Thus, the metal jacket lessens one of the advantages of the fibre optic cable communication system for military and commercial usage while at the same time increasing the manufacturing, material and installation costs as well as compromising the fibre optic cable system itself.

SUMMARY OF THE INVENTION

The invention is concerned with providing a protective sheath for use over a buried fibre optic cable communication system. The cable is protected by a plurality of spikes which extend radially outward from an outer jacket which completely encircles and covers the cable. The outer jacket and spikes are fabricated of a plastic material which can be molded, extruded or cast into suitable spiked configuration. The cable is thus protected from rodent damage by discouragement and potential pain to any animal which may be in the area.

Accordingly, it is an object of the invention to provide a cable protection from rodents for use with a fibre optic cable communication system wherein a plastic, non-metallic sheath having a plurality of radial spikes extending outwardly surrounding and completely encircles the cable.

Another object of the invention is to provide a cable protection from rodents wherein the advantages of a fibre optic cable system for communication is not compromised by the use of a metal sheath which would be adversely affected by strong electrical and magnetic fields.

Still another object of the invention is to provide a cable protection from rodents for use with a fibre optics communication system which operates with a light transmission concept such that a plastic jacket with spikes would not be subjected to any electromagnetic pulse problems.

A further object of the invention is to provide a cable protection from rodents for use with a fibre optic bundle wherein the manufacturing and installation costs are reduced while still maintaining the advantages of fibre optic cable in an electromagnetic pulse field.

A still further object of the invention is to provide a cable protection from rodents wherein no metal jacket is needed so that the danger of shock to nearby personnel from possible contact with an electrical source is eliminated.

These and other objects, features and advantages will become more apparent after considering the following detailed description taken in conjunction with the annexed drawings and appended claim.

DESCRIPTION OF A PREFERRED EMBODIMENT

Figure 1:
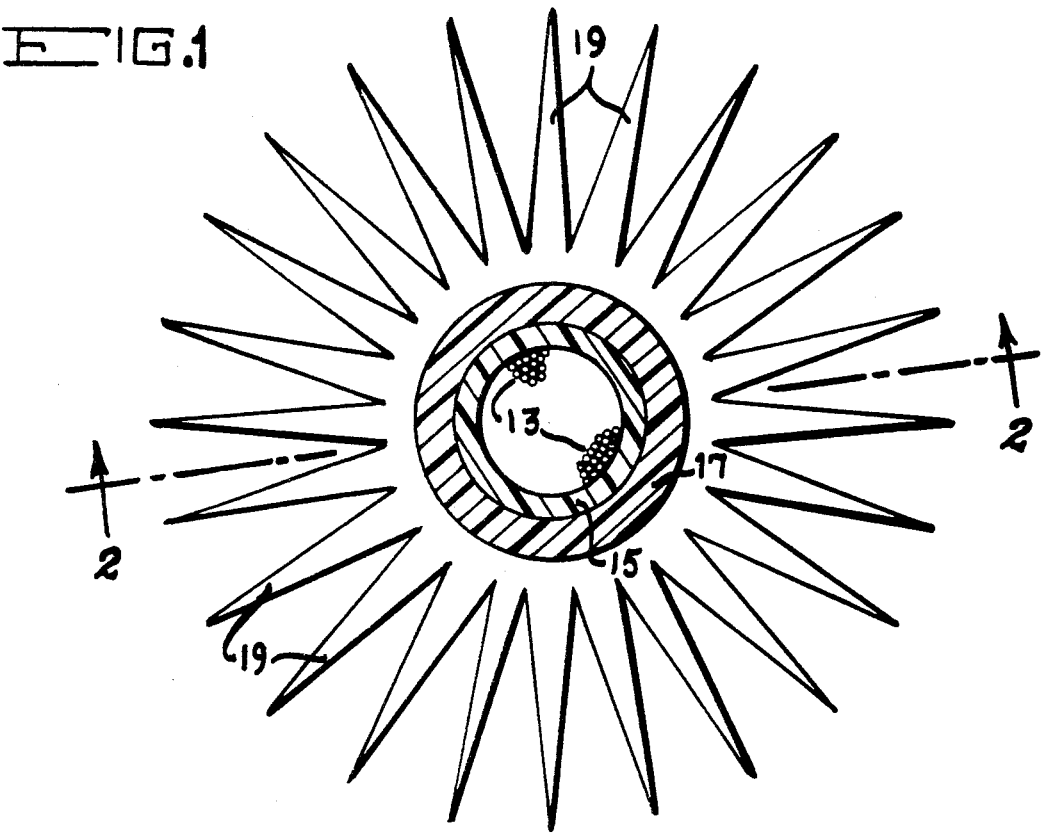
FIG. 1 is an enlarged view in cross-section of a fibre optic bundle with a cable protection for rodents according to the invention installed over and completely encircling the cable.

Referring now to the drawings, in FIG. 1 there is shown an enlarged view in cross-section of a fibre optic cable design suitable for burial underground as a communication system transmission line. The fibre optic cable includes a fibre optic bundle 13 in the central portion thereof to carry the signal in the form of light along the fibres. A plastic inner jacket 15 surrounds the fibre optic bundle 13 and holds the individual fibres in place in the cable. A protective outer jacket 17 surrounds and completely encircles the inner jacket 15 and includes a plurality of radially outward extending pointed spikes 19 on the outer completely encircling surface of the outer jacket 17.

Figure 2:
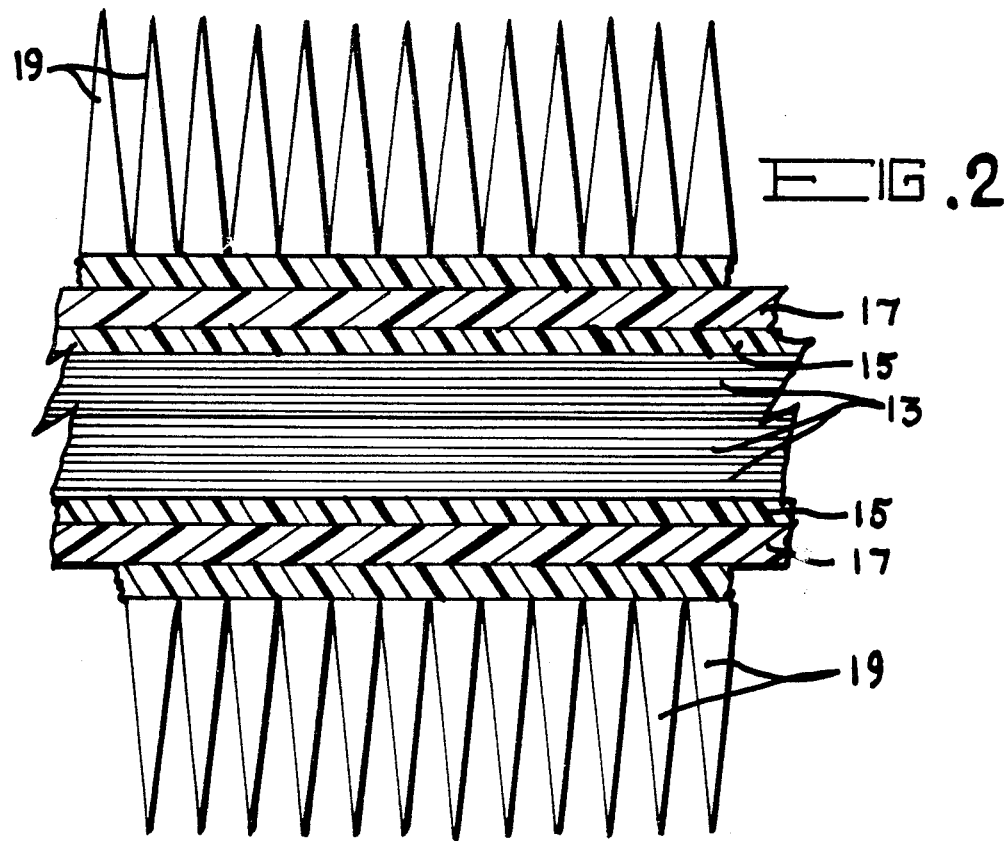
FIG. 2 is a view in longitudinal cross-section taken along the line 2—2 of FIG. 1 showing the completely encircling protective jacket and spikes on the outer diameter of the cable.

In FIG. 2, which is a view in cross-section taken along the line 2—2 in FIG. 1, the fibre optic cable is shown in longitudinal section. The individual fibres of the fibre optic bundle 13 can be seen with the plastic inner jacket 15 therearound. The outer completely encircling jacket 17 and spikes 19 are fabricated of a thermoplastic material suitable for installation over the fibre optic cable 13 by an extrusion process such as described in U.S. Pat. No. 3,928,519. Since fibre optic systems for communications are a light transmission concept, their operation is undisturbed by operation in presence of strong electrical and magnetic fields and/or sources.

A significant problem arises from the tendency of rodents to chew and gnaw their way through these fibre optic cables particularly when buried underground and if it obstructs their path. The hereinbefore described fibre optic cable design reduces this rodent threat, even from underneath (i.e., beneath), while improving cost effectiveness without compromising the advantage of a fibre optic cable communication system. This is accomplished by providing a series of spikes 19 which extend radially outward from the cable for the purpose of discouraging the rodent from burrowing in the vicinity of the cable and causing the rodent to go around the cable if it obstructs his path. Also, the use of an all plastic cable as opposed to previously available steel jacketed fibre optic cable eliminates the problem of grounding the jacket in order to prevent potential shocks to personnel if the metal shield should contact an electrical source. Thus, manufacturing and installation costs are reduced by not requiring a metal shield while still maintaining the advantages of fibre optic cable in an electromagnetic pulse field.

Although the invention has been illustrated in the accompanying drawings and described in the foregoing specification in terms of a preferred embodiment thereof, the invention is not limited to this embodiment. It will be apparent to those skilled in the art that the hereinbefore described arrangement for cable protection from rodents could be useful as a means for preventing rodent damage to plastic water pipe and underground cable for a conventional communication system. Also, it should be noted that certain changes, modifications and substitutions can be made in the construction details without departing from the spirit and scope of the appended claims.

Having thus set forth the nature of my invention, what I claim and desire to secure by Letters Patent of the United States is:

1. A cable protection for preventing damage to a buried fibre optic cable by gnawing rodents comprising, a fibre optic bundle for carrying a communication signal therethrough, a plastic inner jacket surrounding said optic bundle closely adjacent thereto, a circular plastic outer jacket positioned around and completely encircling said inner jacket closely adjacent thereto, and a plurality of pointed spikes extending radially outward from the outer surface of said outer completely encircling jacket, said spikes being fabricated of plastic material to prevent the need for grounding, and to discourage rodents from gnawing and thereby causing damage to the buried cable, even from underneath.

* * * * *